United States Patent [19]

Smith

[11] 4,398,770
[45] Aug. 16, 1983

[54] WIRE SPOKE VEHICLE WHEEL AND METHOD OF MANUFACTURE

[75] Inventor: Richard W. Smith, Lansing, Mich.

[73] Assignee: Motor Wheel Corporation, Lansing, Mich.

[21] Appl. No.: 237,504

[22] Filed: Feb. 23, 1981

[51] Int. Cl.³ .............................................. B60B 7/00
[52] U.S. Cl. .............................. 301/37 SS; 301/37 P; 29/159 A
[58] Field of Search ............... 301/37 SS, 37 P, 54, 301/63 R, 73, 74, 76, 77, 69, 70, 104; 29/159 R, 159 A, 159.01, 159.02, 159.03, 159.1

[56] References Cited

U.S. PATENT DOCUMENTS

| | | |
|---|---|---|
| 173,601 | 2/1876 | Douglas . |
| 482,658 | 9/1892 | Taylor . |
| 834,150 | 10/1906 | Mills . |
| 886,715 | 5/1908 | May . |
| 1,296,904 | 3/1919 | Baker . |
| 1,303,501 | 5/1919 | Rouanet . |
| 1,452,908 | 4/1923 | Colvin . |
| 1,630,226 | 5/1927 | Swain . |
| 1,816,201 | 7/1931 | Adams . |
| 1,819,865 | 8/1931 | Brennen . |
| 3,756,658 | 9/1973 | Adams . |
| 3,762,677 | 10/1973 | Adams . |
| 3,815,200 | 6/1974 | Adams . |
| 3,827,756 | 8/1974 | Mitchell ........................... 301/37 P |
| 3,843,201 | 10/1974 | Buerger ........................... 301/37 SS |
| 3,956,451 | 5/1976 | Adams . |
| 3,993,357 | 11/1976 | Reppert . |
| 4,009,911 | 3/1977 | Apczynski . |
| 4,180,293 | 12/1979 | Norris et al. . |
| 4,221,436 | 9/1980 | Marshall, Jr. . |
| 4,226,478 | 10/1980 | Brown ............................ 301/37 SS |
| 4,251,476 | 2/1981 | Smith . |

FOREIGN PATENT DOCUMENTS

| | | |
|---|---|---|
| 714587 | 3/1931 | France . |
| 778269 | 9/1934 | France . |
| 1090144 | 9/1953 | France . |

Primary Examiner—H. Grant Skaggs
Attorney, Agent, or Firm—Barnes, Kisselle, Raisch, Choate, Whittemore & Hulbert

[57] ABSTRACT

A composite ornamental vehicle wheel assembly comprising a steel wheel having an overlay molded thereon along the axially outboard surface of the wheel disc and the radially inboard surface of the rim. A plurality of wire spoke elements are mounted in paired axially spaced circumferential arrays between nipples threaded into the overlay adjacent the wheel rim and support pockets formed in the overlay radially inwardly of the rim. Annular retaining elements are mounted to the overlay structure and capture the inner ends of the various spoke elements in assembly.

7 Claims, 5 Drawing Figures

WIRE SPOKE VEHICLE WHEEL AND METHOD OF MANUFACTURE

The present invention is directed to vehicle wheels, and particularly to disc wheels and methods of manufacturing disc wheels for passenger vehicles having an ornamental wire spoke appearance on the outboard wheel face.

Increased emphasis is now being placed upon ornamental styling of vehicle wheels, particularly in the passenger car market. A wheel style of particular interest is that which simulates a wire spoke wheel configuration. One approach for achieving wire spoke styling, illustrated for example in U.S. Pat. Nos. 3,843,201 and 4,221,436, is to simulate a wire wheel structure in a wheel cover assembly. Such wheel covers are expensive and are prone to theft. Another proposal exemplified in U.S. Pat. Nos. 3,993,357 has been to replace the stamped steel disc of a typical passenger car wheel with a wire spoke disc assembly in which the wire spokes support the vehicle load. This proposal, although providing a true wire spoke wheel, is costly to manufacture and has been accepted as an original equipment option on only the most high-priced of car models. A third approach wherein the wire spokes form part of the wheel assembly but do not perform any substantial load-bearing function is exemplified in U.S. Pat. Nos. 4,180,293 and 4,226,478.

An object of the present invention is to provide a wheel assembly particularly well suited for passenger car vehicles having an ornamental wire spoke configuration on the wheel outboard face which is lightweight, economical to manufacture, and may be readily repaired using parts provided in the form of a repair kit or the like.

Another object of the invention is to provide an ornamental wire spoke vehicle wheel of the above-described type and a method of manufacturing the same which, in accordance with the broader aspects of the invention, are readily adaptable for providing a wide variety of ornamental wire spoke configurations.

The invention, together with additional objects, features and advantages thereof, will be best understood from the following description, the appended claims and the accompanying drawings in which:

Figure 1:
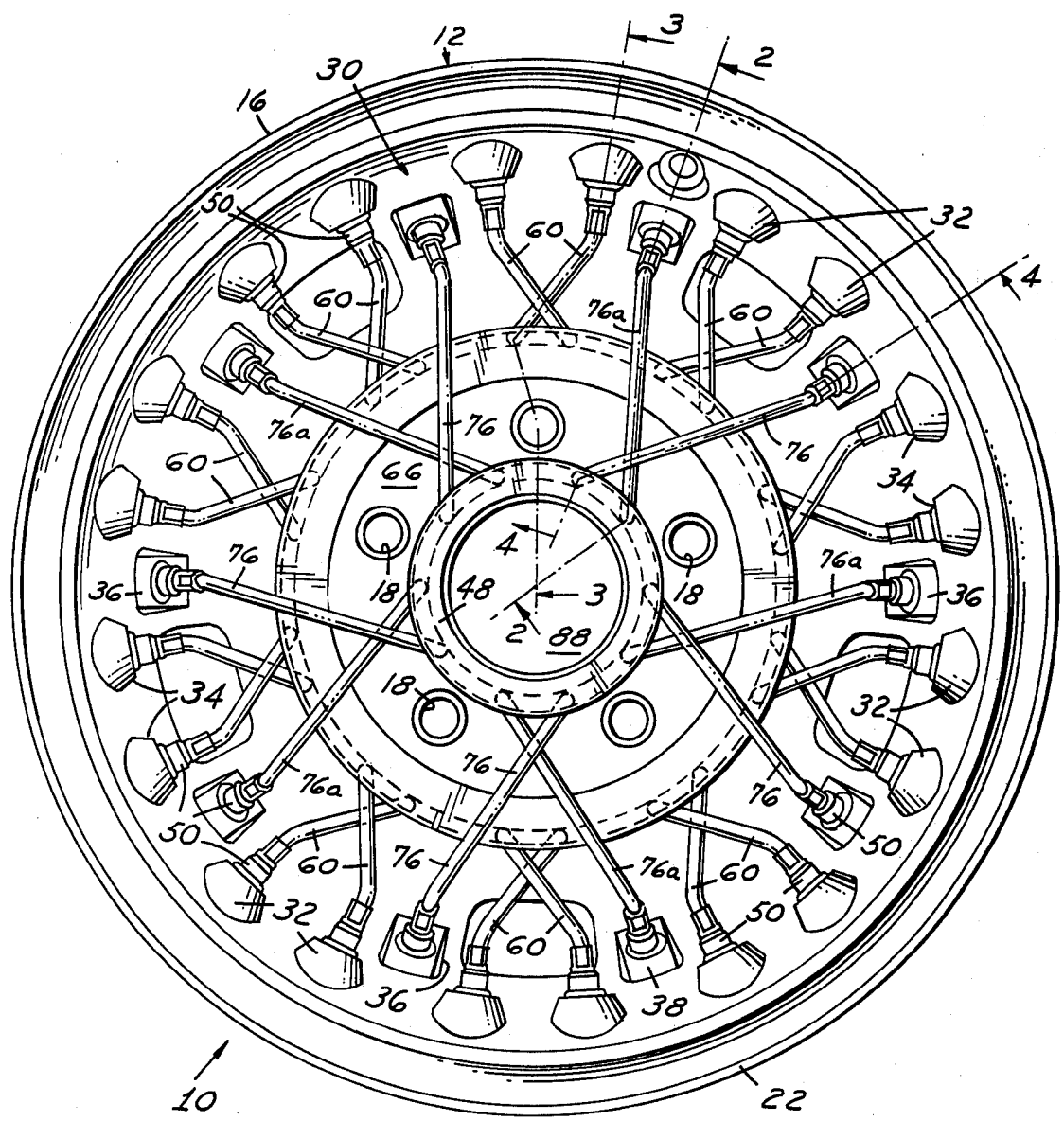
FIG. 1 is a front elevational view of a presently preferred embodiment of the ornamental vehicle wheel provided in accordance with the present invention.
Figure 2:
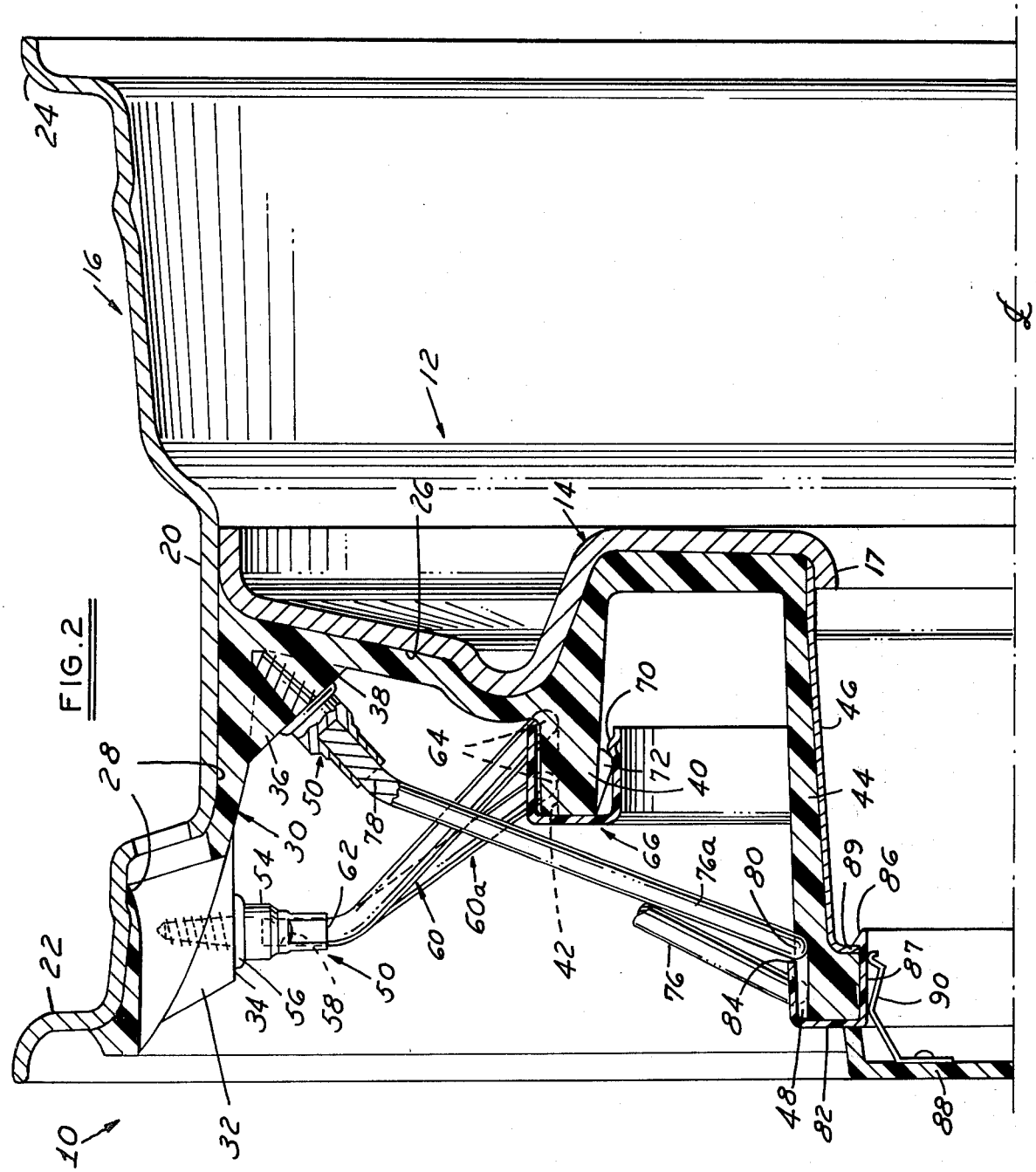
FIG. 2 is a sectional view taken along the line 2—2 in FIG. 1.
Figure 4:
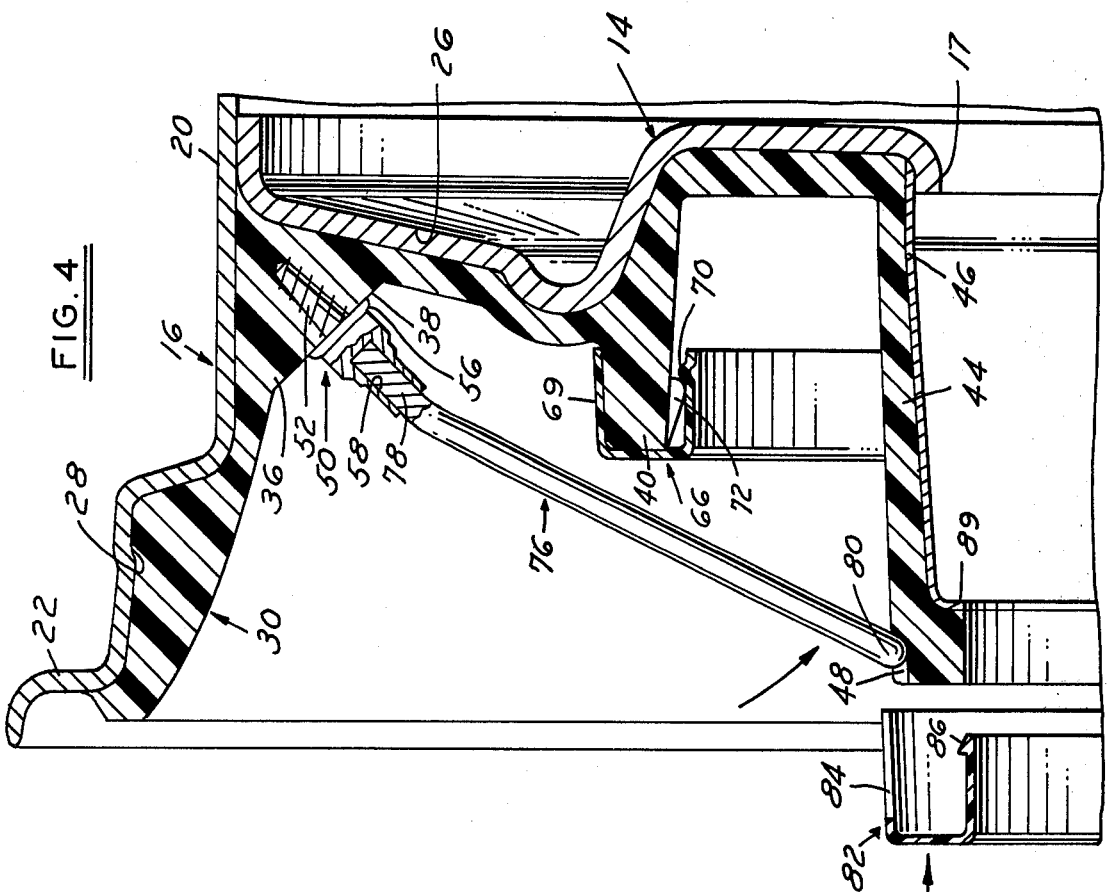
Figure 3:
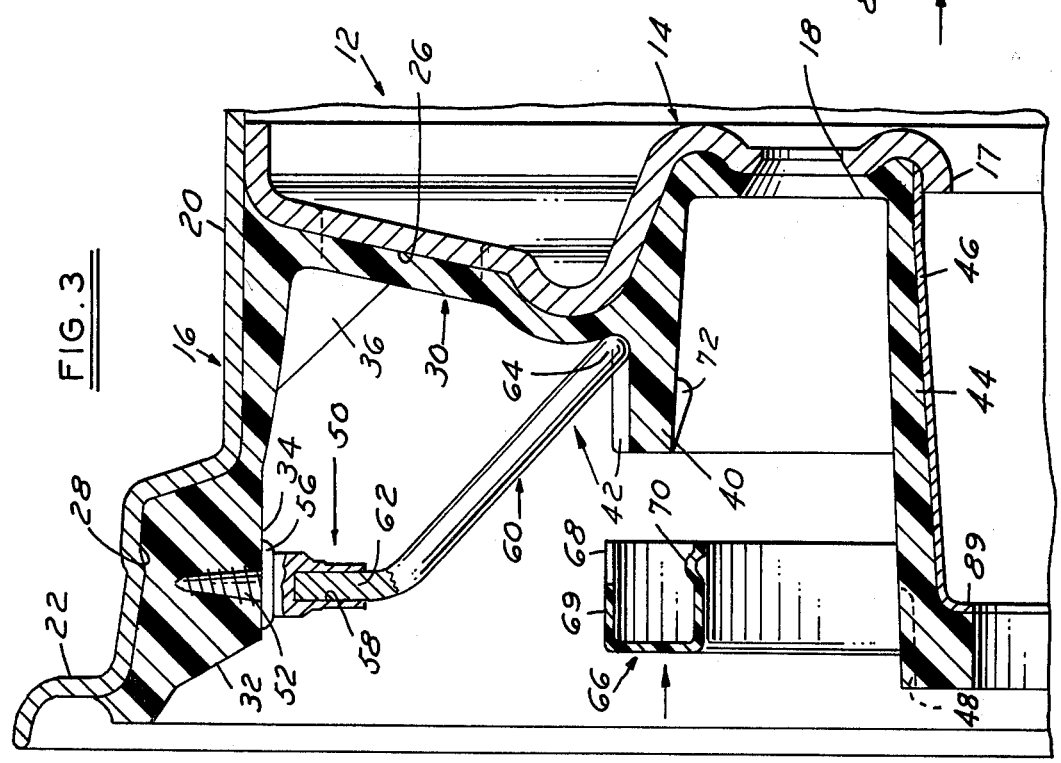
Figure 5:
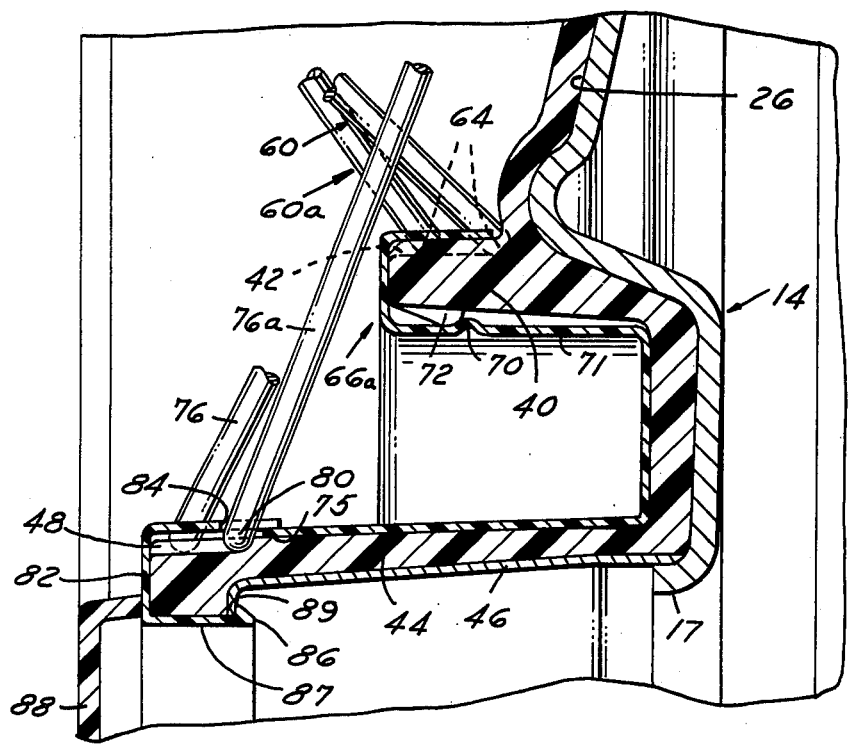

FIGS. 3 and 4 are fragmentary partially exploded sectional views taken approximately along the respective lines 3—3 and 4—4 in FIG. 1, and showing the vehicle wheel in accordance with the invention at successive intermediate stages of assembly; and FIG. 5 is a fragmentary sectional view similar to a portion of FIG. 2 illustrating a modified embodiment of the invention.

Referring to the drawings, and particularly FIGS. 1 and 2, the presently preferred embodiment 10 of a wheel assembly in accordance with the invention illustrated therein comprises a metallic wheel 12 including a wheel disc 14 and a rim 16 secured around the periphery of disc 14. Disc 14 includes a central opening 17 adapted to be received over a wheel hub, and a circumferential array of openings 18 (FIGS. 1 and 3) surrounding hub opening 16 and adapted to be received over the usual threaded lugs for mounting wheel 10 to a vehicle spindle. Rim 16 includes a center drop well 20 and the usual axially spaced bead retaining flanges 22,24 for mounting thereon a typical tubeless pneumatic tire (not shown). The cross sectional contour and other details of disc 14 and rim 16 may be of any suitable configuration and do not per se form part of the present invention.

A molded or cast overlay 30 is permanently secured to the axially outboard face 26 of disc 14 and to that portion 28 of the radially inboard face of rim 16 contiguously adjacent disc outboard face 26. Most preferably, overlay 30 comprises an elastomeric construction permanently adhesively affixed to wheel faces 28,26 by reason of being molded thereon in a manner as taught in U.S. Pat. Nos. 3,815,208 and 3,756,658. Overlay 30 includes a first plurality of bosses 32 formed in angularly spaced pairs (FIG. 1) circumferentially around rim inboard face 28 adjacent the disc-remote edge thereof. Each boss 32 comprises a radially inwardly tapering generally conical body terminating in a radially inwardly facing flat boss surface 34. A second plurality of inboard bosses 36 are formed in a circumferential array adjacent the juncture of disc 14 and rim 16, one boss 36 being angularly disposed between each pair of outboard bosses 32 as best appreciated with reference to FIG. 1. Each boss 36 has an outboard face 38 disposed at an angle (about 45° in the embodiment illustrated in the drawings) with respect to the axis of wheel 10 and directly axially outwardly and radially inwardly with respect to the wheel axis, as best seen in FIG. 2.

Overlay 30 further comprises an annular ledge 40 (FIGS. 2–4) projecting axially from disc outboard face 26 and disposed radially inwardly of rim inboard face 38 surrounding the circular array of mounting openings 18. The radially outer surface of ledge 40 includes a circumferential array of pockets 42 (FIGS. 2 and 3) disposed in angularly spaced pairs in approximate radial alignment between the axis of wheel 10 and a corresponding outboard boss 32. Each pocket 42 opens at the axially outer edge of ledge 40 as shown in FIG. 3 for receiving a spoke end as will be described.

Radially inwardly of ledge 40 and mounting openings 18, overlay 30 further comprises a cone or shell 44 surrounding disc hub opening 17 and projecting axially from disc outboard face 26 to a position in approximate radial alignment with the circumferential array of outboard bosses 32. Shell 44 is circumferentially continuous and is formed over a metallic shell support cup 46 (FIGS. 2–4). A plurality of pockets 48 (FIGS. 2 and 4) are formed on the radially outwardly facing surface of shell 44 in circumferentially spaced pairs, each pocket being in substantial radial alignment between the axis of wheel 10 and a corresponding inboard boss 36. Pockets 44 are formed adjacent and open onto the axially outer edge of shell 44 for receiving spoke ends in the manner to be described. Most preferably, although not necessary, bosses 32,36, ledge 40 and shell 44 are molded as an integral structure interconnected by a layer of overlay material extending along rim and disc faces 26,28.

A plurality of nipples 50 are secured one to each of the overlay bosses 32,36. Each nipple 50 includes a self-tapping threaded portion 52 received within the corresponding boss 32 or 38 and a nipple body 54 having a shoulder 56 with a flat undersurface in flush facing engagement against the corresponding boss face 34 or 38. A blind cylindrical opening is formed in each nipple body 54 in opposed axial alignment with threaded portion 52. For the nipples 50 mounted on bosses 32, the corresponding nipple openings 58 are directed radially inwardly, while for the nipples 50 mounted on bosses 38 the corresponding nipple openings are directed at angles (approximately 45°) radially inwardly and axially outwardly of the wheel.

A first plurality of wire spoke elements 60,60a are mounted in a circumferential array in angularly spaced crossed pairs between nipples 50 received in paired adjacent inboard bosses 32 and the ledge pockets 42 in substantial radial alignment with the opposing boss 32 of the same pair. More particularly, each spoke element 60,60a includes an elongated and angulated cylindrical body having a first end 62 received in the opening 58 of corresponding nipple 50, and a rounded second end 64 received in the pocket 42 radially aligned with the other boss 32 of the same pair. Spoke elements 60,60a are retained in assembly and against rattling by an annular retaining ring or cap 66 received over ledge 40. Ring 66 has a plurality of circumferentially spaced slots 68 (FIG. 3) at the axially inboard edge of the radially outermost portion 69, each slot 68 embracing the end 64 of a corresponding spoke element 60,60a. It will be appreciated with reference to FIGS. 1 and 2 that crossing of the spoke elements 60,60a in respective pairs locates one of the ends 64 of spoke 60 axially inwardly with reference to the corresponding end of spoke 60a in the same pair. In the particular design shown in the drawings, the slots 68 in ring 66 are of differing depth alternating around the circumferential series for close embracing relation with the corresponding spoke end 64. An annular bead 70 on retaining ring 66 is received by snap fit over a plurality of nubs 72 formed on the radially inner surface of ledge 40 for securing ring 66 in assembly.

A second plurality of spoke elements 76,76a are mounted in a circumferential series of angularly spaced crossed pairs between angularly adjacent pairs of bosses 36 and the pocket 48 in shell 44 in approximately radial alignment with the opposing boss of the same pair. As best seen in FIG. 1, the crossed pairs of spoke elements 76,76a embrace alternate pairs of crossed spoke elements 60,60a. More particularly, each spoke element 76,76a comprises an angulated cylindrical body having a first end 78 (FIGS. 2 and 4) received in the openings of a corresponding nipple 50 and a rounded second end 80 resting in a corresponding pocket 48. An annular channel-shaped retaining ring 82 is received over the axially outboard end of hub shell 44 and includes a circumferential series of slots 84 for holding spoke ends 80 in assembly. Crossing of the spokes locates spoke ends 80 of each pair in axially spaced positions, so that slots 84 are preferably of alternating depth around retaining ring 82. A circumferential barb 86 on the inner wall 87 of retaining ring 82 is received by snap-fit within the radially inwardly turned outer edge 89 of shell reinforcement 46, as best seen in FIG. 2, for capturing ring 82 in assembly. A hubcap 88 covers the open end of hub shell 44 and is retained in assembly by a plurality of spring fingers 90 which engage the opposing surface of retaining ring wall 87.

FIG. illustrates a modified embodiment of the invention wherein ring 66 (FIGS. 2-4) is replaced by a ring 66a which is generally S-shaped in a radial cross section and extends at 71 axially inwardly from bead 70, radially inwardly and then axially outwardly along the outer surface of hub shell 44. A plurality of openings (not shown) are formed for respective alignment with wheel mounting openings 18 (FIGS. 1 and 3). An axially outer edge 75 of ring 66a is captured in assembly by ring 82 adjacent pockets 48.

Wheel 12 comprising disc 14 and rim 16 may be formed and joined in any suitable manner. As previously indicated, overlay 30 is most preferably molded onto wheel 12 in the manner taught by U.S. Pat. Nos. 3,815,200 and 3,756,658. A suitable molding apparatus may be formed by following the teachings of U.S. Pat. Nos. 3,762,677 and 3,956,451. All of such patents are assigned to the assignee hereof. Nipples 50 are then assembled to bossess 32,36 as previously described. Where such assembly is accomplished manually, dimples may be located centrally of boss faces 34,38 during the overlay molding operation to assist placement of the nipples. Following assembly of nipples 50 onto overlay 30, spoke elements 60,60a are then assembled to the wheel in the configuration previously described. This is accomplished by inserting each spoke end 62 in a corresponding nipple 50, and then rotating the spoke body about the axis of the nipple opening until each spoke end 64 rests within the corresponding pocket 42. After all spokes 62 are assembled to the wheel as described, retainint ring 66 (or 66a) is assembled onto the wheel. Spoke elements 76,76a are then assembled to the wheel by placement of spoke ends 78 into the opening of the corresponding nipple 50, and then rotating the spoke body until the opposing spoke end 80 rests within the corresponding pocket 48. Retaining ring 82 is then assembled to hub shell 44 as previously described.

Nipples 50 may be formed as a screw machine metal part or injection molded from suitable elastomeric material, and then painted or plated as required. Spoke elements 60,60a,76,76a may be formed from wire stock and plated to match nipples 50. Alternately, the spokes may be formed of solid or hollow resin material, or tubular metal stock. It is also envisioned within the invention in its broadest aspects that nipples 50 may be formed integrally with the spoke elements, although such configuration is not preferred at the present time. Retaining rings 66,82 may be formed in any suitable molding operation, or alternatively of stamped and formed sheet metal construction. It will be appreciated from the foregoing description that the various spoke elements and nipples may be readily repaired in the field by simply reversing the above-described assembly operation until the damaged spoke or nipple can be removed. Repair nipples and spokes may be provided in the form of a kit.

The invention has been described in detail in connection with the preferred embodiment thereof wherein the wheel assembly includes a steel wheel and an overlay molded thereon in accordance with various referenced teachings. However, the invention in its broadest aspects also contemplates utility with other cast and/or molded wheel constructions. For example, the steel wheel and overlay may be replaced by a wheel of cast aluminum or the like having threaded openings for receiving the nipples 50.

Alternatively, the wheel assembly may include a steel wheel and overlay molded thereon in accordance with the teachings of copending application Ser. No. 21,160, filed Mar. 16, 1979 now U.S. Pat. No. 4,251,476 and assigned to the assignee hereof. In accordance with the disclosure of such copending application, the wheel overlay may comprise a low density core and a skin of high density protective resilient elastomeric material covering the outboard surface of the core. The skin is cured in situ simultaneously with the core and is crosslinked thereto for enhanced bonding. This alternative molding procedure is particularly useful where the outer surface of the overlay is to have one or more decorative colors. As yet another alternative, the wheel and overlay may be formed as an integral structure of fiber-reinforced resin material in a compression molding operation in accordance with the teachings of U.S. Application Ser. No. 119,128, filed Feb. 6, 1980 and assigned to the assignee hereof, now U.S. Pat. No. 4,294,639.

The invention claimed is:

1. A method of manufacturing a composite vehicle wheel assembly comprising the steps of:
   (a) forming a vehicle wheel including a disc having an axially oriented outboard face and a rim having a radially oriented inboard face contiguous with said disc outboard face, said disc including a central hub opening and an array of mounting openings surrounding said hub opening, at least said rim and disc face portions of said wheel being formed in a molding operation to include on said disc outboard face a hollow shell circumferentially surrounding said hub opening, a ledge axially projecting from said disc outboard face radially intermediate said mounting openings and said rim, and a circumferential array of radially facing pockets on each of said ledge and shell opening at an edge of said ledge and shell remote from said disc,
   (b) fixedly securing on said inboard rim face first and second pluralities of nipples in respective axially spaced circumferential arrays by embedding a portion of each said nipple into said face, said first plurality being mounted adjacent an edge of said rim face axially remote from said disc and said second plurality being mounted at the juncture of said rim and disc faces, each of said nipples including a nipple opening directed generally radially inwardly,
   (c) mounting a first plurality of wire spokes to said wheel by inserting one end of each said wire spoke of said first plurality into a corresponding said nipple opening among said first plurality of nipples, seating the second end of each said wire spoke of said first plurality in a corresponding said pocket on said ledge and then assembling an annular retaining ring onto said ledge to secure said second ends in said pockets, and
   (d) mounting a second plurality of wire spokes to said wheel by inserting one end of each said wire spoke of said second plurality into a corresponding nipple opening among said second plurality of nipples and seating the second end of each said wire spoke of said second plurality in a corresponding said pocket on said shell, and then assembling an annular retaining ring onto said shell to secure said second ends in said pockets.

2. The method set forth in claim 1 wherein each said wire spoke is angulated, and wherein said step of seating said second ends in steps (c) and (d) comprises the step of rotating each said wire spoke within the corresponding said nipple opening until the said second end rests in the corresponding said pocket.

3. A composite vehicle wheel assembly comprising a metal disc wheel having a disc with an axially outboard face and a rim permanently secured to said disc with a radially inboard face extending axially outwardly with respect to and contiguously with said disc outboard face, an overlay of elastomeric construction permanently adhesively secured to said disc wheel and including at least a first portion disposed adjacent to said rim inboard face and a second portion secured to said disc outboard face radially inwardly of said first portion, a plurality of nipple means individually embedded in and fixedly secured to said first portion of said overlay in a circumferential array extending around said rim inboard face, each of said nipple means having a nipple opening directed generally radially inwardly, a plurality of wire spokes each having an outer end removably received in a corresponding said nipple opening and an inner end seated against said second portion of said overlay, and retaining ring means removably secured to said second portion of said overlay for securing said inner ends of said wire spokes onto said second portion of said overlay whereby said spokes are removably anchored to said elastomeric construction of said overlay and thereby secured against rattling.

4. The composite vehicle wheel assembly set forth in claim 3 wherein each of said nipple means includes a shank individually threadably secured to said first portion of said overlay, and an exposed nipple head seated against said first portion to receive corresponding said first ends of said spokes.

5. The composite vehicle wheel assembly set forth in claim 3 or 4 wherein said second portion of said overlay includes a plurality of radially outwardly facing pockets each opening axially outwardly of said overlay, each said spoke inner end being removably secured within a corresponding said pocket by said retaining ring means.

6. The composite vehicle wheel assembly set forth in claim 5 wherein said disc has a central opening and a circumferential array of mounting openings surrounding said central opening; wherein said second portion of said overlay has an annular ledge adhered to said disc outboard face radially outwardly of said mounting openings and a shell adhered to said disc outboard face surrounding said central opening radially inwardly of said mounting openings, both said ledge and said shell including said pockets, wherein said nipple means includes first and second pluralities of nipples embedded in and secured to said first portion of said overlay in respective axially spaced circumferential arrays, a first of said arrays being disposed adjacent to the outboard edge of said rim inboard face and the second of said arrays being disposed adjacent to the juncture of said rim and disc faces; wherein said wire spokes include first and second arrays of wire spokes, a first said spoke array extending from said first array of nipples adjacent to said rim face edge to said ledge and said second spoke array extending from said second array of nipples adjacent to said juncture to said shell; and wherein said retaining ring means includes first and second retaining ring sections respectively removably received over said ledge and said shell for securing said second spoke ends in the corresponding said pockets.

7. The composite vehicle wheel assembly set forth in claim 6 wherein said retaining ring means, including said first and second sections, is of unitary construction.

* * * * *

UNITED STATES PATENT AND TRADEMARK OFFICE
CERTIFICATE OF CORRECTION

PATENT NO. : 4,398,770
DATED : Aug. 16, 1983
INVENTOR(S) : Richard H. Smith

It is certified that error appears in the above-identified patent and that said Letters Patent are hereby corrected as shown below:

Column 2, line 15, "3,815,208" should be -- 3,815,200 --

Column 2, line 33, "38" should be -- 28 --

Claim 6: line 44, the comma "," should be a semi-colon -- ; --

Signed and Sealed this

Eighteenth Day of October 1983

[SEAL]

Attest:

GERALD J. MOSSINGHOFF

Attesting Officer

Commissioner of Patents and Trademarks